United States Patent [19]

Gartside et al.

[11] Patent Number: 4,556,541
[45] Date of Patent: * Dec. 3, 1985

[54] LOW RESIDENCE TIME SOLID-GAS SEPARATION DEVICE AND SYSTEM

[75] Inventors: Robert J. Gartside, Auburndale, Mass.; Herman N. Woebcke, Stamford, Conn.

[73] Assignee: Stone & Webster Engineering Corporation, Boston, Mass.

[*] Notice: The portion of the term of this patent subsequent to Feb. 8, 2001 has been disclaimed.

[21] Appl. No.: 583,134

[22] Filed: Feb. 24, 1984

Related U.S. Application Data

[60] Division of Ser. No. 394,107, Jul. 1, 1982, which is a continuation of Ser. No. 165,781, Jul. 6, 1979, Pat. No. 4,348,364, which is a continuation-in-part of Ser. No. 55,148, Jul. 6, 1979, Pat. No. 4,288,235.

[51] Int. Cl.[4] ............................................... B01J 8/08
[52] U.S. Cl. .................................... 422/145; 55/196; 55/310; 55/345; 55/424; 55/432; 55/449; 55/461; 55/466; 422/144; 422/147; 422/214
[58] Field of Search .............. 422/144, 147, 214, 145; 55/196, 310, 311, 345, 423, 424, 426, 428, 431, 432, 434, 447–450, 461, 462, 464–466

[56] References Cited

U.S. PATENT DOCUMENTS

| | | | |
|---|---|---|---|
| 1,469,702 | 10/1923 | Spencer | 55/432 |
| 2,059,814 | 11/1936 | Schneider . | |
| 2,328,325 | 8/1943 | Butikofer | 55/257 R |
| 2,439,811 | 4/1948 | Jewell | 55/462 |
| 2,544,687 | 3/1951 | Kalbach | 422/139 |
| 2,698,224 | 12/1954 | Brooke | 55/424 |
| 2,708,920 | 5/1955 | Pasturczak | 55/385 B |
| 2,737,479 | 3/1956 | Nicholson | 55/342 X |
| 2,786,800 | 3/1957 | Myers | 422/144 X |
| 2,848,381 | 8/1958 | Nicholson | 422/214 |
| 2,878,891 | 3/1959 | Ross et al. | 55/466 X |
| 3,074,878 | 1/1963 | Pappas . | |
| 3,215,505 | 11/1965 | Schmalfeld et al. . | |
| 3,528,221 | 9/1970 | Garrett et al. . | |
| 3,553,944 | 1/1971 | Hum et al. . | |
| 3,570,221 | 3/1971 | Oliver . | |
| 4,061,562 | 12/1977 | McKinney et al. | 208/61 |
| 4,097,363 | 6/1978 | McKinney et al. | 208/78 |
| 4,163,650 | 8/1979 | Watson et al. | 55/428 X |
| 4,219,407 | 8/1980 | Haddad et al. | 55/466 X |
| 4,288,235 | 9/1981 | Gartside et al. | 55/196 |
| 4,348,364 | 9/1982 | Gartside et al. | 55/196 |
| 4,433,984 | 2/1984 | Gartside et al. | 55/196 |

*Primary Examiner*—Barry S. Richman
*Assistant Examiner*—William R. Johnson
*Attorney, Agent, or Firm*—Hedman, Gibson, Costigan & Hoare

[57] ABSTRACT

An apparatus and method embodied in a TRC system for rapidly separating particulate solids from a mixed phase solids-gas stream which may be at velocities up to 150 ft./sec. and at high temperature. Specifically, the device is designed for incorporation at the discharge of solid-gas reacting TRC systems having low residence time requirements and carried out in tubular type reactors. Separation is effected by projecting solids by centrifugal force against a bed of solids as the gas phase makes a 180° directional change, said solids changing direction only 90° relative to the incoming stream.

5 Claims, 11 Drawing Figures

LOW RESIDENCE TIME SOLID-GAS SEPARATION DEVICE AND SYSTEM

CROSS REFERENCE TO RELATED CASE

This is a divisional application of Ser. No. 394,107, filed on July 1, 1982, which is a continuation of Ser. No. 165,781 filed July 6, 1979, now U.S. Pat. No. 4,348,364, which is a continuation-in-part of Ser. No. 055,148, filed July 6, 1979, now U.S. Pat. No. 4,288,235. This application is also related to U.S. Pat. No. 4,433,984.

BACKGROUND OF THE INVENTION

1. Field of the Invention

This invention relates generally to a separation system and process to obtain a primary separation of particulate solids from a mixed phase gas-solid stream in a Thermal Regenerative Cracking (TRC) apparatus and process described in U.S. Pat. No. 4,061,562 to McKinney et al and U.S. Pat. No. 4,097,363 to McKinney et al.

2. Description of the Prior Art

Chemical reaction systems utilizing solids in contact with a gaseous or vaporized stream have long been employed. The solids may participate in the reaction as catalyst, provide heat required for an endothermic reaction, or both. Alternatively the solids may provide a heat sink in the case of an exothermic reaction. Fluidized bed reactors have substantial advantages, most notably an isothermal temperature profile. However, as residence time decreases the fluidized bed depth becomes shallower and increasingly unstable. For this reason tubular reactors employing solid-gas contact in pneumatic flow have been used and with great success, particularly in the catalytic cracking of hydrocarbons to produce gasolines where reaction residence times are between 2 and 5 seconds.

As residence times become lower, generally below 2 seconds and specifically below 1 second, the ability to separate the gaseous products from the solids is diminished because there is insufficient time to do so effectively. This occurs because the residence time requirements of separation means such as cyclones begin to represent a disproportionate fraction of the allowable reactor residence time. The problem is acute in reaction systems such as thermal cracking of hydrocarbons to produce olefins and catalytic cracking to produce gasoline using improved catalysts where the total reactor residence time is between 0.2 and 1.0 seconds. In these reaction systems conventional separation devices may consume more than 35% of the allowable contact time between the two phases resulting in product degradation, coke formation, low yields and varying severity.

In non-catalytic, temperature dependent endothermic reactions, rather than separating the phases, it is possible to quench the entire product stream after the requisite reaction period. However, these solids are usually recycled and are regenerated by heating to high temperatures. A quench of the reactor effluent prior to separation would be thermally inefficient. However, it is economically viable to make a primary separation of the particulate solids before quench of the gaseous stream. The residual solids in the quenched stream may then be separated in a conventional separator inasmuch as solids gas contact is no longer a concern.

In some reaction systems, specifically catalytic reactions at low or moderate temperatures, quench of the product gas is undesirable from a process standpoint. In other cases the quench is ineffective in terminating the reaction. Thus, these reaction systems require immediate separation of the phases to remove catalyst from the gas phase. Once the catalyst has been removed, the mechanism for reaction is no longer present.

The prior art has attempted to separate the phases rapidly by use of centrifugal force or deflection means, as exemplified by U.S. Pat. No. 2,737,479 to Nicholson; U.S. Pat. No. 2,878,891 to Ross; and U.S. Pat. No. 3,074,878 to Pappas.

In a TRC system having a short residence time (i.e., in the range of 0.05 to 2 seconds, at temperatures in the range of 1300° and 2500° F.), the product of $C_2H_4$ is favored. This means that the reaction must be quenched rapidly. When solids are used, they must be separated from the gas rapidly or quenched with the gas. If the gases and solids are not separated rapidly (but separated) as in a cyclone, and then quenched, product degradation will occur. If the total mix is quenched, to avoid rapid separation, a high thermal inefficiency will result since all the heat of the solids will be rejected to some lower level heat recovery. Hence, a rapid high efficiency separator is optimal for a TRC process.

SUMMARY OF INVENTION

It is an object of the separator of this invention to obtain a primary separation of particulate solids from a mixed phase gas-solid stream, as particularly adapted for use in a TRC system.

It is also an object of the separator to effect the separation rapidly and with a minimum of erosion.

An additional object of this invention is to provide a separation system that obtains essentially complete separation of gas from the solids phase, although a controlled flow of gas with the solids phase is consistent with the operation of the device.

Another object of this invention is to provide a separation system to afford essentially complete separation of solids from the mixed phase stream.

A further object is to effect a separation at high temperature and/or high velocity conditions with a minimum of gas product degradation.

Another object of this invention is to provide a method for rapidly attaining a primary separation of solids from a mixed phase gas-solid stream.

These and other objects of this invention will be apparent from an inspection of the specification and figures and claims.

The separation device and system of the present invention as embodied in a TRC system having a low residence time, rapidly disengages particulate solids from a mixed phase gas-solids stream with a minimum of erosion. The separator consists of a chamber having an inlet at one end and a solids outlet at the other with the gas outlet therebetween. Each inlet and outlet is normal to the basic flow pattern within the separator. The gas outlet is oriented so that the gas portion of the feed undergoes a 180° change in direction, while the solids outlet is preferably aligned for downflow. Solids are projected by centrifugal force to a wall of the separator normal to and opposite to the inlet as the gas changes direction 180° forming thereat a bed of solids having an arcuate surface configuration of approximately 90° upon which subsequent solids impinge. The curve of the bed extends to the solids outlet and forms a path along which solids flow. Erosion of the wall opposite the inlet of the separator is diminished or eliminated by formation of the bed, which also aids in establishing a U-shaped 180° flow pattern of the gas stream.

The separation system is comprised of the primary separator, a secondary separator, and a stripping vessel. The gas outlet of the primary separator is connected to the secondary separator via a conduit, while the stripping vessel is similarly connected to the solids outlet. Pressure regulating means are used to control the flow of gas to the stripping vessel.

In the preferred separator embodiment a weir is used to establish a more stable bed, although a separator without a weir may be used. Alternatively, the solids outlet flow path may be restricted by other means which aid in the deaeration of solids. However, in all embodiments of the separator of the present invention the loss of gas entrained with the solids phase is small because of the directional changes imposed on both gas and solid phases.

In the preferred embodiment the separator is designed within several geometric constraints in order to maximize the separation efficiency. It is essential that the flow path have a rectangular cross section in order to obtain good efficiency. To obtain high efficiencies a separator with an inlet inside diameter $D_i$ should preferably have a flow path height of at least $D_i$ or 4 inches, whichever is greater. Similarly, the width of the flow path should be between 0.75 and 1.25 $D_i$ while the distance between inlet and gas outlet centerlines should be no greater than 4 times $D_i$.

DESCRIPTION OF INVENTION

Figure 1:
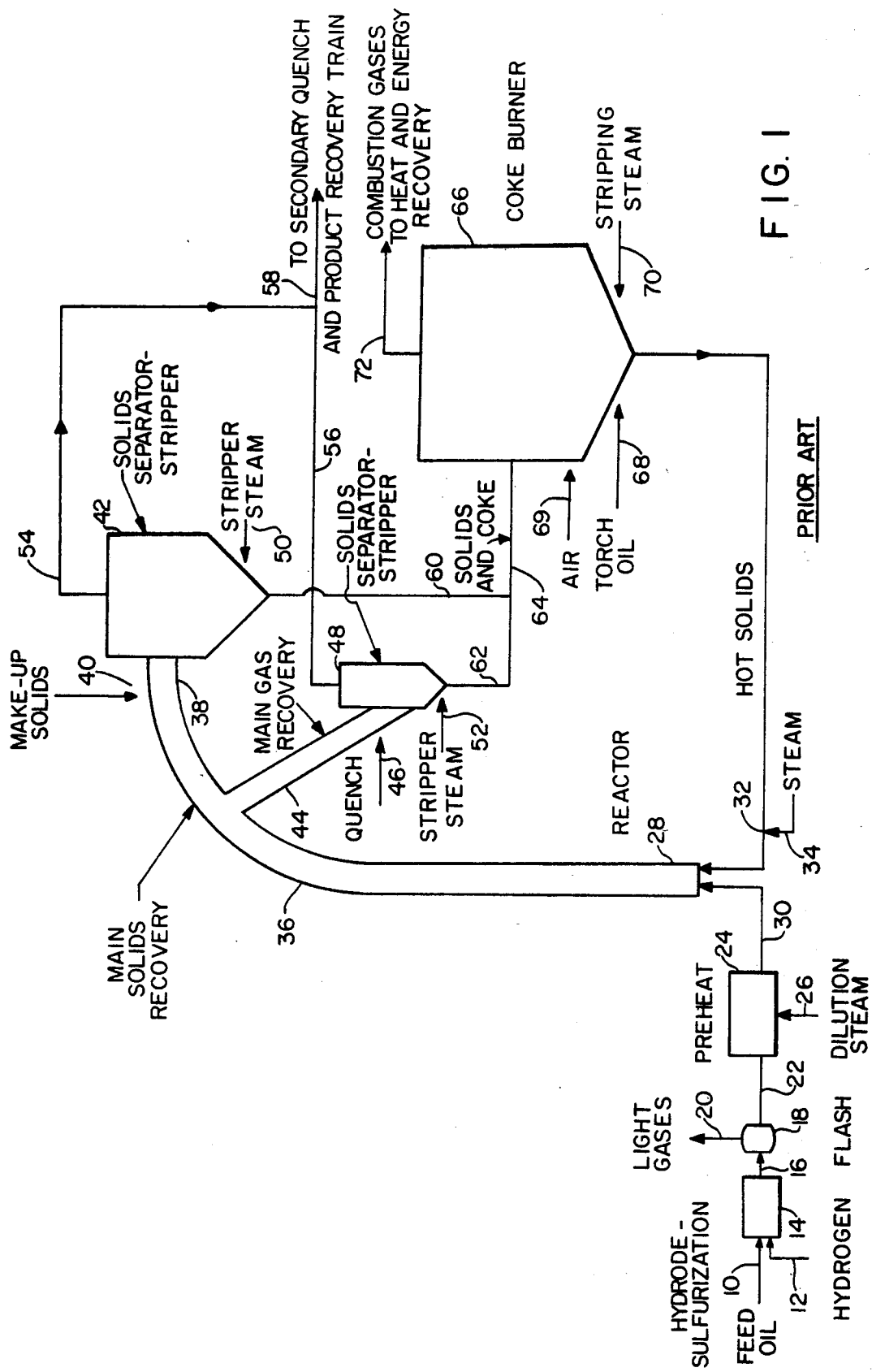
FIG. 1 is a schematic diagram of a TRC system and process according to the prior art.
Figure 2:
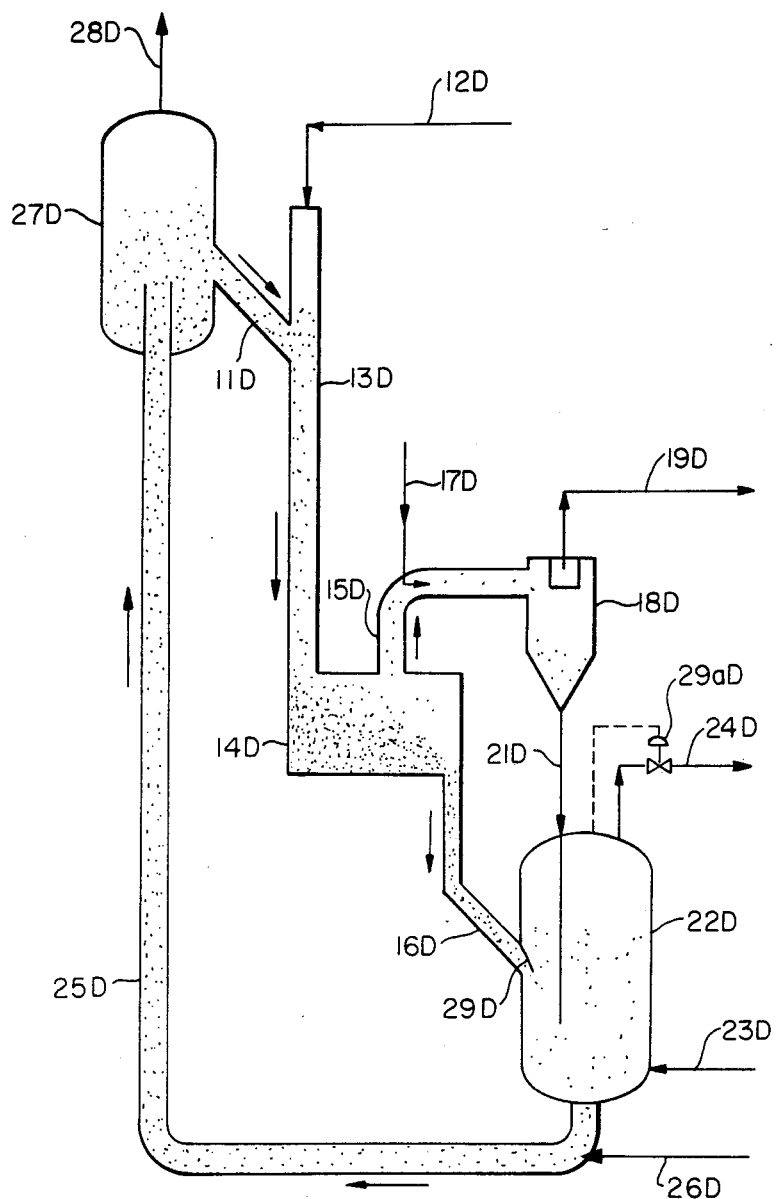
FIG. 2 is a schematic flow diagram of the separation system of the present invention as appended to a typical tubular reactor.

FIG. 2 is a schematic flow diagram showing the installation of the separator system of the present invention in a typical TRC tubular reactor system handling dilute phase solid-gas mixtures. The prior art TRC system is illustrated in FIG. 1 and provides that thermal cracker feed oil or residual oil, with or without blended distillate heavy gas, enters the system through line 10 and hydrogen enters the system through line 12. Together the feed oil and hydrogen pass through hydrodesulfurized zone 14. Hydrodesulfurization effluent passes through line 16 and enters flash chamber 18 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desired, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and then combined in line 58 for passage to a secondary quench and product recovery train, not shown. Coke-laden solids are removed from solids separators 42 and 48 through lines 60 and 62, respectively, and combined in line 64 for passage to coke burner 66. If required, torch oil can be added to burner 66 through line 68 while stripping steam may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28.

In order to produce a cracked product containing ethylene and molecular hydrogen, petroleum residual oil is passed through the catalytic hydrodesulfurization zone in the presence of hydrogen at a temperature between 650° F. and 900° F., with the hydrogen being chemically combined with the oil during the hydrocycling step. The hydrodesulfurization residence oil passes through the thermal cracking zone together with the entrained inert hot solids functioning as the heat source and a diluent gas at a temperature between about 1300° F. and 2500° F. for a residence time between about 0.05 to 2 seconds to produce the cracked product as ethylene and hydrogen. For the production of ethylene by thermally cracking a hydrogen feed at least 90 volume percent of which comprises a light gas oil fraction of a crude oil boiling between 400° F. and 650° F., the hydrocarbon feed, along with diluent gas and entrained inert hot gases are passed through the cracking zone at a temperature between 1300° F. and 2500° F. for a residence time of 0.05 to 2 seconds. The weight ratio of gas oil to fuel oil is at least 0.3, while the cracking severity corresponds to a methane yield of at least 12 weight percent based on said feed oil. Quench cooling of the product immediately upon leaving the cracked zone to a temperature below 1300° F. ensures that the ethylene yield is greater than the methane yield on a weight basis.

Referring to FIG. 2 in the subject invention, in lieu of a separation zone or curved segment region 36 and the quench area 44 of the prior art TRC system (see FIG. 1), solids and gas enter the tubular reactor 13D through lines 11D and 12D respectively. The reactor effluent flows directly to separator 14D where a separation into a gas phase and a solids phase stream is effected. The gas phase is removed via line 15D, while the solid phase is sent to the stripping vessel 22D via line 16D. Depending upon the nature of the process and the degree of separation, an in-line quench of the gas leaving the separator via line 15D may be made by injecting quench material from line 17D. Usually, the product gas contains residual solids and is sent to a secondary separator 18D, preferably a conventional cyclone. Quench material should be introduced in line 15D in a way that precludes back flow of quench material to the separator. The residual solids are removed from separator 18D via line 21D, while essentially solids free product gas is removed overhead through line 19D. Solids from lines 16D and 21D are stripped of gas impurities in fluidized bed stripping vessel 22D using steam or other inert fluidizing gas admitted via line 23D. Vapors are removed from the stripping vessel through line 24D and, if economical or if need be, sent to down-stream purification units. Stripped solids removed from the vessel 22D through line 25D are sent to regeneration vessel 27D using pneumatic transport gas from line 26D. Off gases are removed from the regenerator through line 28D. After regeneration the solids are then recycled to reactor 13D via line 11D.

The separation 14D should disengage solids rapidly from the reactor effluent in order to prevent product degradation and ensure optimal yield and selectivity of the desired products. Further, the separator 14D operates in a manner that eliminates or at least significantly reduces the amount of gas entering the stripping vessel 22D inasmuch as this portion of the gas product would be severely degraded by remaining in intimate contact with the solid phase. This is accomplished with a positive seal which has been provided between the separator 14D and the stripping vessel 22D. Finally, the separator 14D operates so that erosion is minimized despite high temperature and high velocity conditions that are inherent in many of these processes. The separator system of the present invention is designed to meet each one of these criteria as is described below.

Figure 3:
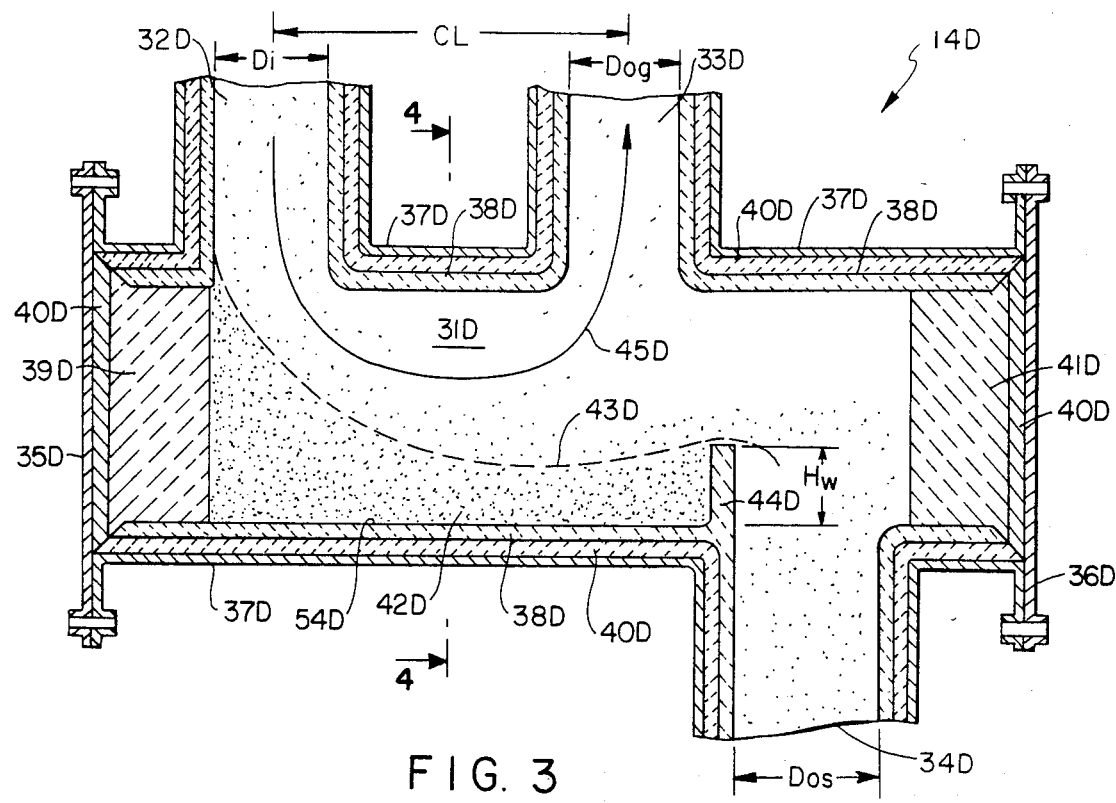
FIG. 3 is a cross sectional elevational view of the preferred embodiment of the separator.

FIG. 3 is a cross sectional elevational view showing the preferred embodiment of solids-gas separation device 14D of the present invention. The separator 14D is provided with a separator shell 37D and is comprised of a solids-gas disengaging chamber 31D having an inlet 32D for the mixed phase stream, a gas phase outlet 33D, and a solids phase outlet 34D. The inlet 32D and the solids outlet 34D are preferably located at opposite ends of the chamber 31D. While the gas outlet 33D lies at a point therebetween. Clean-out and maintenance manways 35D and 36D may be provided at either end of the chamber 31D. The separator shell 37D and manways 35D and 36D preferably are lined with erosion resistant linings 38D, 39D and 41D respectively which may be required if solids at high velocities are encountered. Typical commercially available materials for erosion resistant lining include Carborundum Precast Carbofrax D, Carborundum Precast Alfrax 201 or their equivalent. A thermal insulation lining 40D may be placed between shell 37D and lining 38D and between the manways and their respective erosion resistant linings when the separator is to be used in high temperature service. Thus, process temperatures above 1500° F. (870° C.) are not inconsistent with the utilization of this device.

Figure 4:
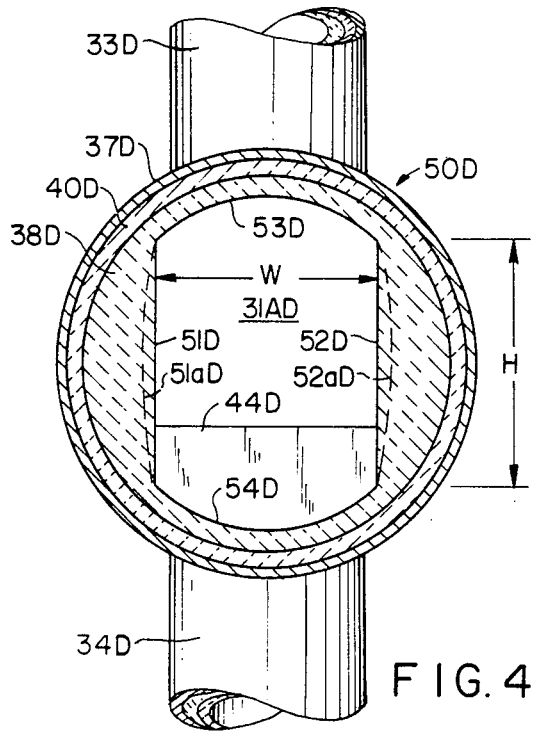
FIG. 4 is a cutaway view through section 4—4 of FIG. 3.
Figure 5:
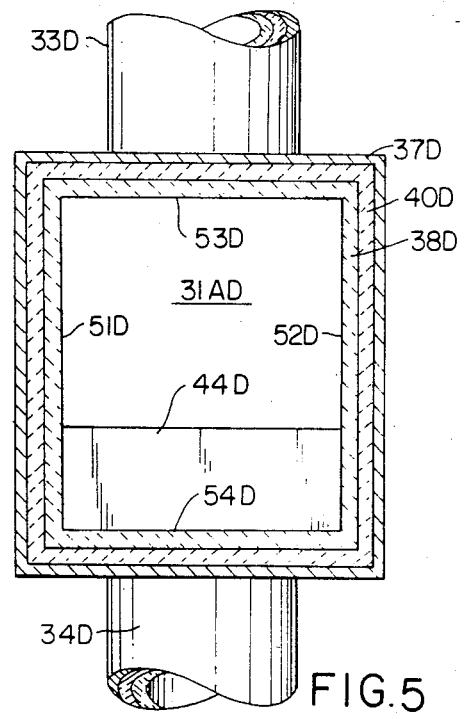
FIG. 5 is a cutaway view of FIG. 3 showing an alternate geometric configuration of the separator shell.

FIG. 4 shows a cutaway view of the separator along section 4—4. For greater strength and ease of construction the separator 14D shell is preferably fabricated from cylindrical sections such as pipe 50D, although other materials may, of course, be used. It is essential that longitudinal side walls 51D and 52D should be rectilinear, or slightly arcuate as indicated by the dotted lines 51aD and 52aD. Thus, flow path 31aD through the separator is essentially rectangular in cross section having a height H and width W as shown in FIG. 4. The embodiment shown in FIG. 4 defines the geometry of the flow path by adjustment of the lining width for walls 51D and 52D. Alternatively, baffles, inserts, weirs or other means may be used. In like fashion the configuration of walls 53D and 54D transverse to the flow path may be similarly shaped, although this is not essential. FIG. 5 is a cutaway view of FIG. 3 wherein the separation shell 37D is fabricated from a rectangular conduit. Because the shell 37D has rectilinear walls 51D and 52D it is not necessary to adjust the width of the flow path with a thickness of lining. Linings 38D and 40D could be added for erosion and thermal resistance respectively.

Again referring to FIG. 3, inlet 32D and outlet 33D are disposed normal to flow path 31D (shown in FIG. 4) so that the incoming mixed phase stream from inlet 32D is required to undergo a 90° change in direction upon entering the chamber. As a further requirement, however, the gas phase outlet 33D is also oriented so that the gas phase upon leaving the separator has completed a 180° change in direction.

Centrifugal force propels the solid particles to the wall 54D opposite inlet 32D of the chamber 31D, while the gas portion, having less momentum, flows through the vapor space of the chamber 31D. Initially, solids impinge on the wall 54D, but subsequently accumulate to form a static bed of solids 42D, which ultimately forms in a surface configuration having a curvilinear arc 43D of approximately 90°. Solids impinging upon the bed are moved along the curvilinear arc 43D to the solids outlet 34D which is preferably oriented for downflow of solids by gravity. The exact shape of the arc 43D is determined by the geometry of the particular separator and the inlet stream parameters such as velocity, mass flowrate, bulk density, and particle size. Because the force imparted to the incoming solids is directed against the static bed 42D rather than the separator 14D itself, erosion is minimal. Separator efficiency, defined as the removal of solids from the gas phase leaving through outlet 33D is, therefore, not affected adversely by high inlet velocities, up to 150 ft./sec., and the separator 14D is operable over a wide range of dilute phase densities, preferably between 0.1 and 10.0 lbs./ft$^3$. The separator 14D of the present invention achieves efficiencies of about 80%, although the preferred embodiment, discussed below, can obtain over 90% removal of solids.

It has been found that separator efficiency is dependent upon separator geometry inasmuch as the flow path must be essentially rectangular and the relationship between height H, and the sharpness of the U-bend in the gas flows is significant.

Referring to FIGS. 3 and 4 we have found that for a given height H of chamber 31D, efficiency increases as the 180° U-bend between inlet 32D and outlet 33D becomes progressively sharper; that is, as outlet 33D is brought progressively closer to inlet 32D. Thus, for a given H the efficiency of the separator increases as the flow path and, hence, residence time decreases. Assuming an inside diameter $D_i$ of inlet 32D, the preferred distance CL between the centerlines of inlet 32D and outlet 33D is less than $4.0D_i$, while the most preferred distance between said centerlines is between 1.5 and $2.5D_i$. Below $1.5D_i$ better separation is obtained but difficulty in fabrication makes this embodiment less attractive in most instances. Should this latter embodiment be desired, the separator 14D would probably require a unitary casting design because inlet 32D and outlet 33D would be too close to one another to allow welded fabrication.

It has been found that the height of flow path H should be at least equal to the value of $D_i$ or 4 inches in height, whichever is greater. Practice teaches that if H is less than $D_i$ or 4 inches the incoming stream is apt to disturb the solids in the bed 42D, thereby re-entraining solids in the gas product leaving through outlet 33D. Preferably H is on the order of twice $D_i$ to obtain even greater separation efficiency. While not otherwise limited, it is apparent that too large an H eventually merely increases residence time without substantive increases in efficiency. The width W of the flow path is preferably between 0.75 and 1.25 times $D_i$, most preferably between 0.9 and $1.10D_i$.

Outlet 33D may be of any inside diameter. However, velocities greater than 75 ft./sec. can cause erosion because of residual solids entrained in the gas. The inside diameter of outlet 34D should be sized so that a pressure differential between the stripping vessel 22D shown in FIG. 2 and the separator 14D exist such that a static height of solids is formed in solids outlet line 16D. The static height of solids in line 16D forms a positive seal which prevents gases from entering the stripping vessel 22D. The magnitude of the pressure differential between the stripping vessel 22D and the separator 14D is determined by the force required to move the solids in bulk flow to the solids outlet 34D as well as the height of solids in line 16D. As the differential increases the net flow of gas to the stripping vessel 22D decreases. Solids, having gravitational momentum, overcome the differential, while gas preferentially leaves through the gas outlet 33D.

By regulating the pressure in the stripping vessel 22D it is possible to control the amount of gas going to the stripper. The pressure regulating means may include a check or "flapper" valve 29D at the outlet of line 16D, or a pressure control valve 29aD in line 24D. Alternatively, as suggested above, the pressure may be regulated by selecting the size of the outlet 34D and conduit 16D to obtain hydraulic forces acting on the system that set the flow of gas to the stripper 32D. While such gas is degraded, we have found that an increase in separation efficiency occurs with a bleed of gas to the stripper of less than 10%, preferably between 2 and 7%. Economic and process considerations would dictate whether this mode of operation should be used. It is also possible to design the system to obtain a net backflow of gas from the stripping vessel. This gas flow should be less than 10% of the total feed gas rate.

By establishing a minimal flow path, consistent with the above recommendations, residence times as low as 0.1 seconds or less may be obtained, even in separators having inlets over 3 feet in diameter. Scale-up to 6 feet in diameter is possible in many systems where residence times approaching 0.5 seconds are allowable.

In the preferred embodiment of FIG. 3, a weir 44D is placed across the flow path at a point at or just beyond the gas outlet to establish a positive height of solids prior to solids outlet 34D. By installing a weir (or an equivalent restriction) at this point a more stable bed is established thereby reducing turbulence and erosion. Moreover, the weir 44D establishes a bed which has a crescent shaped curvilinear arc 43D of slightly more than 90°. An arc of this shape diverts gas towards the gas outlet and creates the U-shaped gas flow pattern illustrated diagrammatically by line 45D in FIG. 3. Without the weir 44D an arc somewhat less than or equal to 90° would be formed, and which would extend asymptotically toward outlet 34D as shown by dotted line 60D in the schematic diagram of the separator of FIG. 6. While neither efficiency nor gas loss (to the stripping vessel) is affected adversely, the flow pattern of line 61D increases residence time, and more importantly, creates greater potential for erosion at areas 62D, 63D and 64D.

Figure 6:
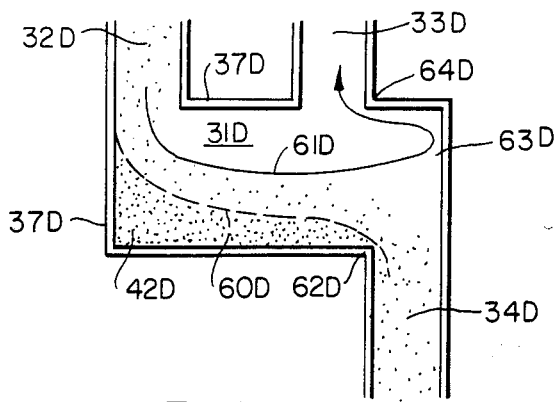
FIG. 6 is a sketch of the separation device of the present invention indicating gas and solids phase flow patterns in a separator without a weir.
Figure 7:
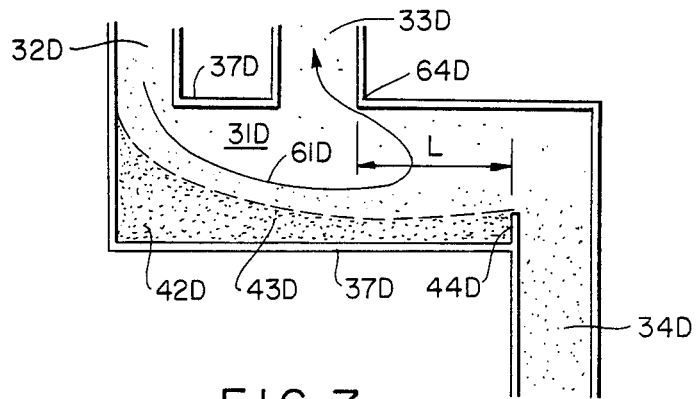
FIG. 7 is a sketch of an alternate emobdiment of the separation device having a weir and an extended separation chamber.

The separator of FIG. 7 is a schematic diagram of another embodiment of the separator 14D, said separator 14D having an extended separation chamber in the longitudinal dimension. Here, the horizontal distance L between the gas outlet 33D and the weir 44D is extended to establish a solids bed of greater length. L is preferably less than or equal to $5D_i$. Although the gas flow pattern 61D does not develop the preferred U-shape, a crescent shaped arc is obtained which limits erosion potential to area 64D. Embodiments shown by FIGS. 6 and 7 are useful when the solids loading of the incoming stream is low. The embodiment of FIG. 6 also has the minimum pressure loss and may be used when the velocity of the incoming stream is low.

Figure 8:
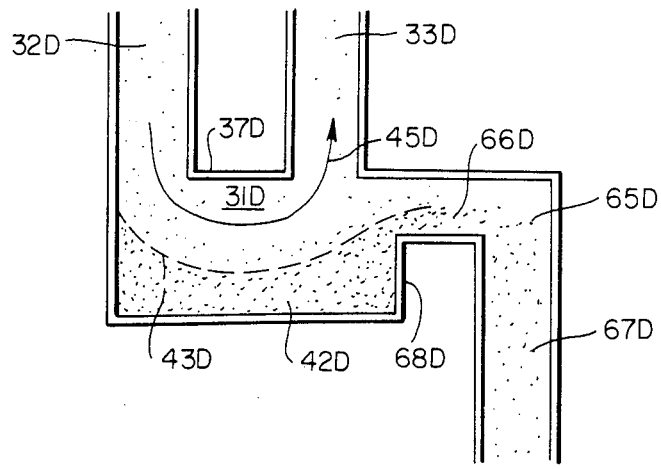
FIG. 8 is a sketch of an alternate embodiment of the separation device wherein a stepped solids outlet is employed, said outlet having a section collinear with the flow path as well as a gravity flow section.

As shown in FIG. 8 it is equally possible to use a stepped solids outlet 65D having a section 66D collinear with the flow path as well as a gravity flow section 67D. Wall 68D replaces weir 44D, and arc 43D and flow pattern 45D are similar to the preferred embodiment of FIG. 3. Because solids accumulate in the restricted collinear section 66D, pressure losses are greater. This embodiment, then, is not preferred where the incoming stream is at low velocity and cannot supply sufficient force to expel the solids through outlet 65D. However, because of the restricted solids flow path, better deaeration is obtained and gas losses are minimal.

Figure 9:
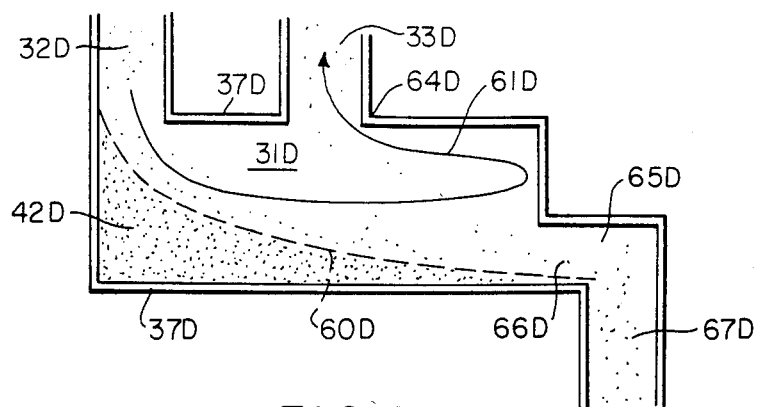
FIG. 9 is a variation of the embodiment of FIG. 8 in which the solids outlet of FIG. 7 is used, but is not stepped.

FIG. 9 illustrates another embodiment of the separator 14D of FIG. 8 wherein the solids outlet is stepped. Although a weir is not used, the outlet restricts solids flow which helps form the bed 42D. As in FIG. 7, an extended L distance between the gas outlet and solids outlet may be used.

Figure 10:
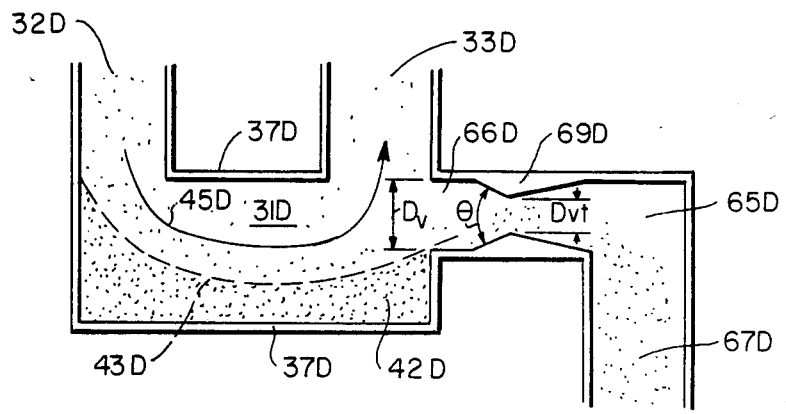
FIG. 10 is a sketch of a variation of the separation device of FIG. 8 wherein a venturi restriction is incorporated in the collinear section of the solids outlet.
Figure 11:
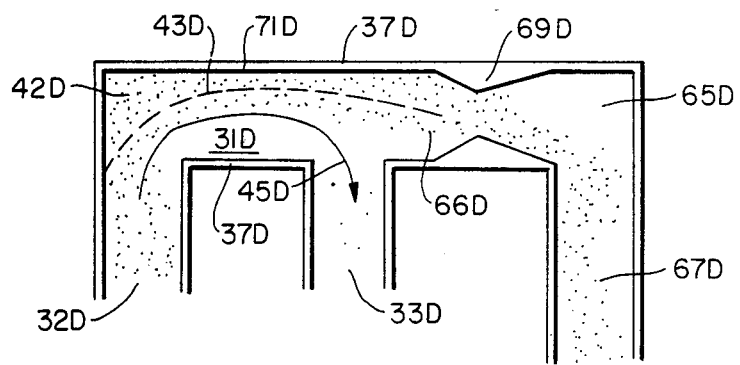
FIG. 11 is a variation of the embodiment of FIG. 10 oriented for use with a riser type reactor.

The separator of FIG. 8 or 9 may be used in conjunction with a venturi, an orifice, or an equivalent flow restriction device as shown in FIG. 10. The venturi 69D having dimensions $D_v$ (diameter at venturi inlet), $D_{vt}$ (diameter of venturi throat), and $\theta$ (angle of cone formed by projection of convergent venturi walls) is placed in the collinear section 66D of the outlet 65D to greatly improve deaeration of solids. The embodiment of FIG. 11 is a variation of the separator shown in FIG. 10. Here, inlet 32 and outlet 33D are oriented for use in a riser type reactor. Solids are propelled to the wall 71D and the bed thus formed is kept in place by the force of the incoming stream. As before the gas portion of the feed follows the U-shaped pattern of line 45D. However, an asymptotic bed will be formed unless there is a restriction in the solids outlet. A weir would be ineffective in establishing bed height, and would deflect solids into the gas outlet. For this reason the solids outlet of FIG. 10 is preferred. Most preferably, the venturi 69D is placed in collinear section 66D as shown in FIG. 11 to improve the deaeration of the solids. Of course, each of these alternate embodiments may have one or more of the optional design features of the basic separator discussed in relation to FIGS. 3, 4 and 5.

The separator of the present invention is more clearly illustrated and explained by the examples which follow. In these examples, which are based on data obtained during experimental testing of the separator design, the separator has critical dimensions specified in Table I. These dimensions (in inches except as noted) are indicated in the various drawing figures and listed in the Nomenclature below:

CL: Distance between inlet and gas outlet centerlines
$D_i$: Inside diameter of inlet
$D_{og}$: Inside diameter of gas outlet
$D_{os}$: Inside diameter of solids outlet
$D_v$: Diameter of venturi inlet
$D_{vt}$: Diameter of venturi throat
H: Height of flow path
$H_w$: Height of weir or step
L: Length from gas outlet to weir or step as indicated in FIG. 7
W: Width of flow path
$\theta$: Angle of cone formed by projection of convergent venturi walls, degrees The observed separation efficiency was 89.1%, and was accomplished in a gas phase residence time of approximately 0.008 seconds. Efficiency is defined as the percent removal of solids from the inlet stream.

EXAMPLE 2

The gas-solids mixture of Example 1 was processed in a separator having a configuration illustrated by FIG. 7. In the example the L dimension is 2 inches; all other dimensions are the same as Example 1. By extending the separation chamber along its longitudinal dimension, the flow pattern of the gas began to deviate from the U-shape discussed above. At a result residence time was longer and turbulence was increased. Separation efficiency for this example was 70.8%.

EXAMPLE 3

The separator of Example 2 was tested with an inlet stream comprised of 85 ft.$^3$/min. of air and 102 lbs./min. of silica alumina which gave a stream density of 1.18 lbs./ft.$^3$, or approximately twice that of Example 2. Separation efficiency improved to 83.8%.

EXAMPLE 4

The preferred separator of Example 1 was tested at the inlet flow rate of Example 3. Efficiency increased slightly to 91.3%.

EXAMPLE 5

The separator of FIG. 3 was tested at the conditions of Example 1. Although the separation dimensions are specified in Table I note that the distance CL between inlet and gas outlet centerlines was 5.875 inches, or

TABLE I

| | Dimensions of Separators in Examples 1 to 10 in inches* | | | | | | | | | |
|---|---|---|---|---|---|---|---|---|---|---|
| | Examples | | | | | | | | | |
| Dimension | 1 | 2 | 3 | 4 | 5 | 6 | 7 | 8 | 9 | 10 |
| CL | 3.875 | 3.875 | 3.875 | 5.875 | 5.875 | 3.875 | 11 | 11 | 3.5 | 3.5 |
| $D_i$ | 2 | 2 | 2 | 2 | 2 | 2 | 6 | 6 | 2 | 2 |
| $D_{og}$ | 1.75 | 1.75 | 1.75 | 1.75 | 1.75 | 1.75 | 4 | 4 | 1 | 1 |
| $D_{os}$ | 2 | 2 | 2 | 2 | 2 | 2 | 6 | 6 | 2 | 2 |
| $D_v$ | — | — | — | — | — | — | — | — | — | 2 |
| $D_{vt}$ | — | — | — | — | — | — | — | — | — | 1 |
| H | 4 | 4 | 4 | 4 | 4 | 4 | 12 | 12 | 7.5 | 6.75 |
| $H_w$ | 0.75 | 0.75 | 0.75 | 0.75 | 0.75 | 0.75 | 2.25 | 2.25 | 0 | 4.75 |
| L | 0 | 2 | 2 | 0 | 0 | 0 | 0 | 0 | 10 | 0 |
| W | 2 | 2 | 2 | 2 | 2 | 2 | 6 | 6 | 2 | 2 |
| $\theta$, degrees | — | — | — | — | — | — | — | — | — | 28.1° |

*Except as noted

EXAMPLE 1

In this example a separator of the preferred embodiment of FIG. 3 was tested on a feed mixture of air and silica alumina. The dimensions of the apparatus are specified in Table I. Note that the distance L from the gas outlet to the weir was zero.

The inlet stream was comprised of 85 ft.$^3$/min. of air and 52 lbs./min. of silica alumina having a bulk density of 70 lbs./ft$^3$ and an average particle size of 100 microns. The stream density was 0.162 lbs./ft.$^3$ and the operation was performed at ambient temperature and atmospheric pressure. The velocity of the incoming stream through the 2 inch inlet was 65.5 ft./sec., while the outlet gas velocity was 85.6 ft./sec. through a 1.75 inch diameter outlet. A positive seal of solids in the solids outlet prevented gas from being entrained in the solids leaving the separator. Bed solids were stabilized by placing a 0.75 inch weir across the flow path.

about three times the diameter of the inlet. This dimension is outside the most preferred range for CL which is between 1.50 and 2.50 Di. Residence time increased to 0.01 seconds, while efficiency was 73.0%.

EXAMPLE 6

Same conditions apply as for Example 5 except that the solids loading was increased to 102 lbs./min. to give a stream density of 1.18 lbs./ft.$^3$. As observed previously in Examples 3 and 4, the separator efficiency increased with higher solids loading to 90.6%.

EXAMPLE 7

The preferred separator configuration of FIG. 3 was tested in this Example. However, in this example the apparatus was increased in size over the previous examples by a factor of nine based on flow area. A 6 inch inlet and 4 inch outlet were used to process 472 ft.$^3$/min. of air and 661 lbs./min. of silica alumina at 180° F. and 12 psig. The respective velocities were 40 and 90 ft./sec. The solids had a bulk density of 70 lbs./ft.$^3$ and the stream density was 1.37 lbs./ft.$^3$ Distance CL between inlet and gas outlet centerlines was 11 inches, or 1.83 times the inlet diameter; distance L was zero. The bed was stabilized by a 2.25 inch weir, and gas loss was prevented by a positive seal of solids. However, the solids were collected in a closed vessel, and the pressure differential was such that a positive flow of displaced gas from the collection vessel to the separator was observed. This volume was approximately 9.4 ft.$^3$/min. Observed separator efficiency was 90.0%, and the gas phase residence time was approximately 0.02 seconds.

EXAMPLE 8

The separator used in Example 7 was tested with an identical feed of gas and solids. However, the solids collection vessel was vented to the atmosphere and the pressure differential adjusted such that 9% of the feed gas, or 42.5 ft.$^3$/min. exited through the solids outlet at a velocity of 3.6 ft./sec. Separator efficiency increased with this positive bleed through the solids outlet to 98.1%.

EXAMPLE 9

The separator of FIG. 9 was tested in a unit having a 2 inch inlet and a 1 inch gas outlet. The solids outlet was 2 inches in diameter and was located 10 inches away from the gas outlet (dimension L). A weir was not used. The feed was comprised of 85 ft.$^3$/min. of air and 105 lbs./min. of spent fluid catalytic cracker catalyst having a bulk density of 45 lbs./ft.$^3$ and an average particle size of 50 microns. This gave a stream density of 1.20 lbs./ft.$^3$ Gas inlet velocity was 65 ft./sec. while the gas outlet velocity was 262 ft./sec. As in Example 7 there was a positive counter-current flow of displaced gas from the collection vessel to the separator. This flow was approximately 1.7 ft.$^3$/min. at a velocity of 1.3 ft./sec. Operation was at ambient temperature and atmospheric pressure. Separator efficiency was 95.0%.

EXAMPLE 10

The separator of FIG. 10 was tested on a feed comprised of 85 ft.$^3$/min. of air and 78 lbs./min. of spent Fluid Catalytic Cracking catalyst. The inlet was 2 inches in diameter which resulted in a velocity of 65 ft./sec., the gas outlet was 1 inch in diameter which resulted in an outlet velocity of 262 ft./sec. This separator had a stepped solids outlet with a venturi in the collinear section of the outlet. The venturi mouth was 2 inches in diameter, while the throat was 1 inch. A cone of 28.1° was formed by projection of the convergent walls of the venturi. An observed efficiency of 92.6% was measured, and the solids leaving the separator were completely deaerated except for interstitial gas remaining in the solids' voids.

We claim:

1. In a TRC apparatus having a tubular thermal cracking reactor including a reaction chamber cracking zone, means for delivering hot inert particulate solids to the reactor, means for delivering hydrocarbon feed or hydrodesulfurized residual oil fluid feed to the reactor and means for delivering a diluent gas at a temperature between 1300° F. and 2500° F. to the reactor and wherein the hydrocarbon fluid feed or the hydrodeslufurized residual oil fluid feed along with the inert particulate solids and diluent gas are passed through the cracking zone for a residence time of 0.05 to 2 seconds, the improvement comprising a solids-gas separator designed to effect rapid removal of particulate solids from a dilute mixed phase stream of solids and gas, said separator comprising a chamber for disengaging solids from the incoming mixed phase stream, said chamber having rectilinear or slightly arcuate longitudinal walls to form a flow path essentially rectangular in cross section, said chamber also having a mixed phase inlet means, a gas phase outlet means located between the mixed phase inlet means and solids outlet means, and a solids phase outlet means, having a first section which is of smaller cross-sectional area than said chamber and which is collinear with the flow path and a second section normal to the first section aligned for downflow of solids by gravity, with the inlet means being located at one end of the chamber and disposed normal to the flow path, the solids outlet means being located at the other end of the chamber, and the gas outlet means located therebetween oriented in such a manner so as to effect a 180° change in direction of the gas within said solids-gas separator.

2. In a TRC apparatus as in claim 1, wherein the improvement further comprises that the mixed phase inlet inside diameter is $D_i$; the height H of the flow path is equal to or greater than 4 inches, with the proviso that said height is at least $D_i$, and the width W of the flow path is between 0.75 and 1.25$D_i$; the distance from the mixed phase inlet means to the gas phase outlet means is less than or equal to 4.0$D_i$ as measured between the respective centerlines of the inlet means and the gas phase outlet means.

3. The separators of claim 1 wherein the improvement further comprises a flow restriction means placed within the collinear section of the solids removal outlet means.

4. The separators of claim 3 wherein the flow restriction means is an orifice means.

5. The separators of claim 3 wherein the flow restriction means is a venturi means.

* * * * *